(12) United States Patent
Schedelbeck et al.

(10) Patent No.: US 9,577,701 B2
(45) Date of Patent: *Feb. 21, 2017

(54) RECONFIGURABLE COMMUNICATION DEVICE AND METHOD

(71) Applicant: Lantiq Deutschland GmbH, Neubiberg (DE)

(72) Inventors: Gert Schedelbeck, Munich (DE);
Stefan Krause, Munich (DE);
Reinhard Stolle, Friedberg (DE);
Umashankar Thyagarajan, San Ramon, CA (US)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,138

(22) Filed: Jun. 27, 2016

(65) Prior Publication Data

US 2016/0336992 A1    Nov. 17, 2016

Related U.S. Application Data

(63) Continuation of application No. 13/956,922, filed on Aug. 1, 2013, now Pat. No. 9,379,762, which is a continuation of application No. 13/226,537, filed on Sep. 7, 2011, now abandoned, which is a continuation of application No. 11/860,329, filed on Sep. 24, 2007, now abandoned, which is a continuation of application No. 11/684,468, filed on Mar. 9, 2007, now abandoned.

(51) Int. Cl.
| | |
|---|---|
| H04L 27/26 | (2006.01) |
| H04B 1/401 | (2015.01) |
| H04L 5/14 | (2006.01) |
| H04L 12/26 | (2006.01) |

(52) U.S. Cl.
CPC .......... *H04B 1/401* (2013.01); *H04L 5/1438* (2013.01); *H04L 43/08* (2013.01)

(58) Field of Classification Search
CPC .... H04B 1/401; H04L 27/2608; H04L 5/1438
See application file for complete search history.

(56) References Cited

U.S. PATENT DOCUMENTS

| | | |
|---|---|---|
| 4,788,657 A | 11/1988 | Douglas et al. |
| 5,751,701 A | 5/1998 | Langberg et al. |

(Continued)

FOREIGN PATENT DOCUMENTS

DE    102004026214 A1    12/2005

*Primary Examiner* — David Bilodeau
(74) *Attorney, Agent, or Firm* — Eschweiler & Potashnik, LLC

(57) ABSTRACT

A communication device includes a transmitter operable to couple to a plurality of transceivers via a plurality of transmission channels, transmit payload data via the plurality of transmission channels, and obtain monitored transmission conditions for one or more transmission channels in the plurality of transmission channels. During operation, the transmitter is further operable to generate reconfiguration request signals resultant from processing the monitored transmission conditions and transmit the reconfiguration request signals on transmission channels in the plurality of transmission channels.

29 Claims, 15 Drawing Sheets

(56) References Cited

U.S. PATENT DOCUMENTS

| | | |
|---|---|---|
| 6,628,704 B1 | 9/2003 | Long et al. |
| 6,891,854 B2 | 5/2005 | Zhang et al. |
| 7,248,890 B1 * | 7/2007 | Raghavan ............... H04L 25/14 379/252 |
| 7,593,426 B1 * | 9/2009 | Lee ......................... H04L 5/006 370/464 |
| 2005/0123028 A1 | 6/2005 | Cioffi et al. |
| 2005/0159177 A1 | 7/2005 | Trachewsky et al. |
| 2008/0260011 A1 | 10/2008 | Peeters |

* cited by examiner

RECONFIGURABLE COMMUNICATION DEVICE AND METHOD

PRIORITY CLAIM

This application is a continuation of application Ser. No. 13/956,922, filed 1 Aug. 2013, which is a continuation of application Ser. No. 13/226,537 (now abandoned), filed 7 Sep. 2011, which is a continuation of application Ser. No. 11/860,329 (now abandoned), filed 24 Sep. 2007, which is a continuation of application Ser. No. 11/684,468, filed 9 Mar. 2007 (now abandoned), the content of each of said applications incorporated herein by reference in their entirety.

TECHNICAL FIELD

The present invention relates to a data transmission method, a communication system, a transceiver, a transmitter and a receiver.

BRIEF DESCRIPTION OF THE DRAWINGS

Hereinafter, exemplary embodiments of the invention will be described with reference to the drawings.

DETAILED DESCRIPTION

Figure 1:
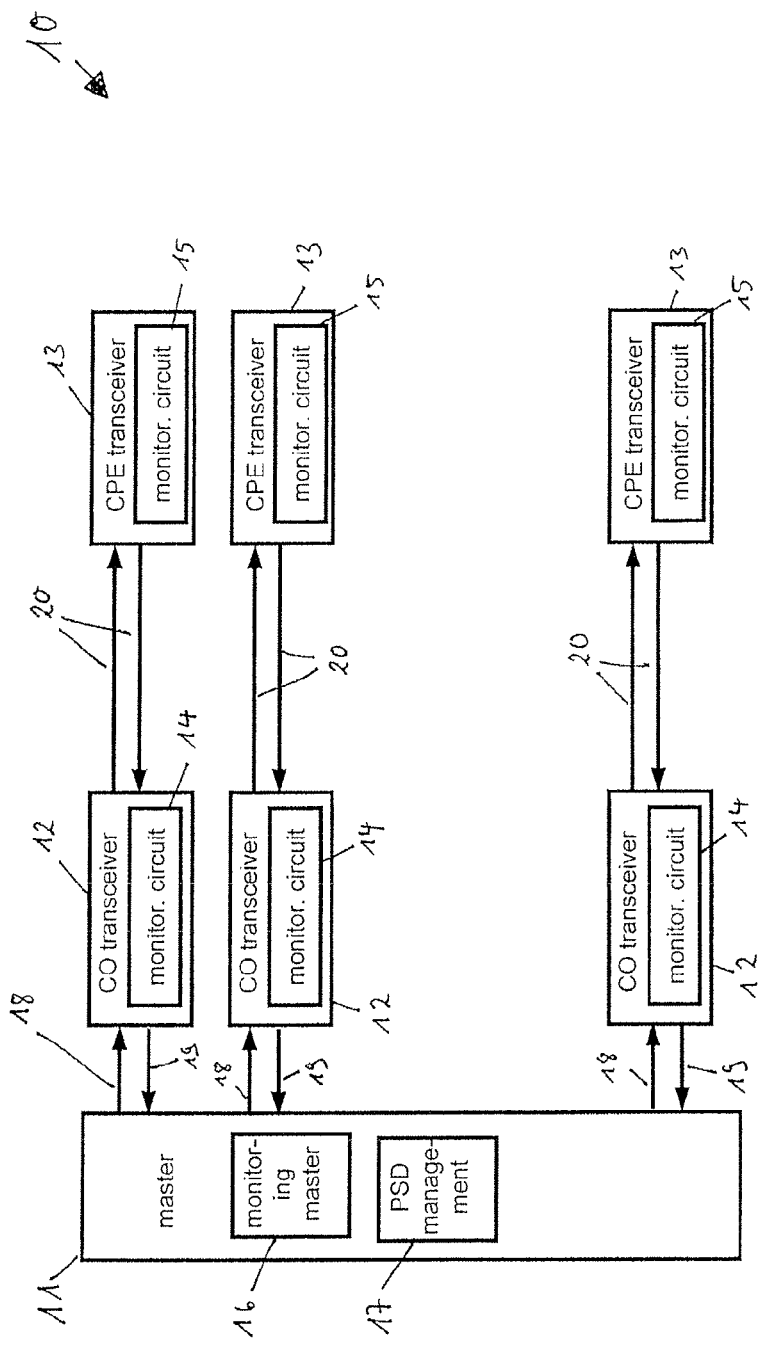
FIG. 1 is a schematic block diagram representation of a communication system according to one embodiment of the present invention.

In the following, exemplary embodiments of the present invention will be described in detail. It is to be understood that the following description is given only for the purpose of illustrating the invention and is not to be taken in a limiting sense. Rather, the scope of the invention is defined only by the appended claims and is not intended to be limited by the exemplary embodiments described hereinafter.

It is also to be understood that, in the following description of exemplary embodiments, any direct connection or coupling between functional blocks, devices, components, or other physical or functional units shown in the drawings or described herein could also be implemented by an indirect connection or coupling. While some of the exemplary embodiments will be described in the context of DSL technology below, it is to be understood that the various embodiments are not limited thereto. Rather, the methods and devices described below may be applied in other communication devices and methods, such as in wireless communication.

It should be understood that the features of the various exemplary embodiments described herein may be combined with each other, unless specifically noted otherwise.

The present invention relates to data transmission methods and devices employed in data transmission, such as communication systems, transceivers, transmitters and receivers.

FIG. 1 is a schematic block diagram representation of a communication system 10, according to an exemplary embodiment of the invention. The communication system 10 comprises a master controller 11, a plurality of first transceivers 12 and a plurality of second transceivers 13. In the exemplary embodiment illustrated, the plurality of first transceivers 12 is installed in a central office (CO) or local exchange, while the plurality of second transceivers 13 is installed in customer premises as customer premises equipment (CPE). Each of the first transceivers 12 is coupled to one of the second transceiver 13 to transmit signals 20 in upstream and downstream directions.

Upon start-up of a first transceiver 12/second transceiver 13 pair, the master controller 11 provides configuration parameters to the first transceiver 12 of the pair, which configuration parameters may include information such as a service level of the subscriber, minimum guaranteed data transmission rate, maximum power spectrum or power spectral density (PSD) available, or similar data. In an initialization phase, the first and second transceivers 12, 13 of the pair establish operational parameters for various components of the transceivers 12, 13 to improve data transmission quality. This may be effected, e.g., in a handshake-phase between the first and second transceivers 12, 13. However, due to changing noise conditions, a change of the configuration originally specified may become desirable. For example, when the first and second transceivers 12, 13 are connected by copper wire pairs in a pair-wise fashion and several copper wire pairs are arranged proximal to one another, e.g. in the form of a wire bundle, changing noise conditions may result from a larger number of subscribers going online, i.e., a larger number of first transceiver 12/second transceiver 13 pairs establishing data transmission therebetween, resulting in cross-talk between copper wire pairs.

To accommodate changing noise conditions/the first transceiver 12 and the second transceiver 13 are equipped with monitoring circuits 14 and 15/respectively. The monitoring circuits 14, 15 monitor transmission conditions such as a signal to noise ratio/for upstream and downstream data transmission, respectively. The monitoring circuits 14, 15 also provide information 19 on the monitored transmission conditions for the respective data connections to the master controller 11. The master controller 11 comprises a master monitor 16 to collect the information 19 on the monitored transmission conditions. Thus, the monitoring circuits 14, 15, and the master monitor 16 in combination may perform the function of a monitoring device which monitors transmission conditions for a plurality of first and second transceiver. The master controller 11 further comprises a PSD management unit 17 to determine new configuration parameters, e.g., a new maximum PSD or a new signal to noise margin (SNRM), based on the monitored transmission conditions. In one embodiment, the master monitor 16 and the PSD management unit 17 may respectively be implemented as dedicated special-purpose circuits. In another embodiment/the master monitor 16 and the PSD management unit 17 may be implemented in software which includes instructions to direct a processor, e.g., the CPU of a computer, to perform the functions of monitoring transmission conditions and determining new configuration parameters.

The determination of the new configuration parameters for the various pairs of the first and second transceivers 12, 13 may be effected by the PSD management unit 17 in various ways. In one embodiment t the PSD management unit 17 determines a new PSD for each of the transceiver pairs which is online based on a model that takes into account the transmission conditions between plural pairs of the first and second transceivers 12, 13. In one embodiment, the model may take into account cross-talk between data communication channels, e.g., copper wire pairs, associated with different pairs of the first and second transceivers 12, 13. Further, in one embodiment, parameters according to various criteria, such as increasing an average data transmission rate in upstream and/or downstream directions for a plurality of transceiver pairs, preventing data transmission rates to fall below the guaranteed minimum data transmission rates for a maximum number of transceiver pairs, or similar objectives.

Once the new configuration parameters have been determined for one transceiver pair or for a plurality of transceiver pairs, the master controller 11 provides a signal 18 to the first transceiver 12 of the respective transceiver pair, the signal 18 including information on the new configuration parameters. Responsive to the signal 18, the first and second transceivers 12, 13 of the respective transceiver pair(s) may be reconfigured to the new configuration parameters. In one embodiment, the reconfiguration of the first and second transceivers 12, 13 may include adapting an operation of various transceiver components to the new configuration parameters. As used herein, the term "configuration parameter" refers to any parameter which defines general boundary conditions on an operation of a data transmission system and transmitted signals. Examples of "configuration parameters" include bounds for a PSD that may be employed to generate signals, the number of tones, tone spacing or bit allocation for discrete multi-tone (DMT) signals, minimum or maximum net data rates, signal to noise margins, or similar parameters. Further, the term "configuration" of a device, such as a transmitter, receiver or transceiver as used herein refers to a state in which this device operates in accordance with given configuration parameters. The terms "reconfiguration" or "reconfiguring" as used herein refer to a change of a state to accommodate new configuration parameters. The term "operational parameters" as used herein in connection with a device, such as a transmitter, receiver or transceiver, or in connection with a component of such a device, refers to a parameter that influences operation of the respective device or component. Examples of "operational parameters" include cut-off frequencies of filters, amplifier gains of amplifiers, sampling frequencies of analog to digital converters (AID converters), sampling times or other parameters of a time domain equalizer, parameters determining operation of a frequency domain equalizer, or similar parameters.

As will be explained in more detail below, according to embodiments of the present invention, the transceivers of a transceiver pair or a transmitter and a receiver may be reconfigured online. As used herein, the term "reconfigured online" relates to a reconfiguration that may be achieved without transition to a dedicated reconfiguration phase in which data transmission services are interrupted for a longer period of time. In other words, according to embodiments of the present invention, a reconfiguration may be effected without requiring an interruption of data transmission services. Thus, according to various embodiments, the reconfiguration may be provided during "showtime," when the transmitters, receivers, or transceivers are operational for the communication of live, payload data.

Figure 2:
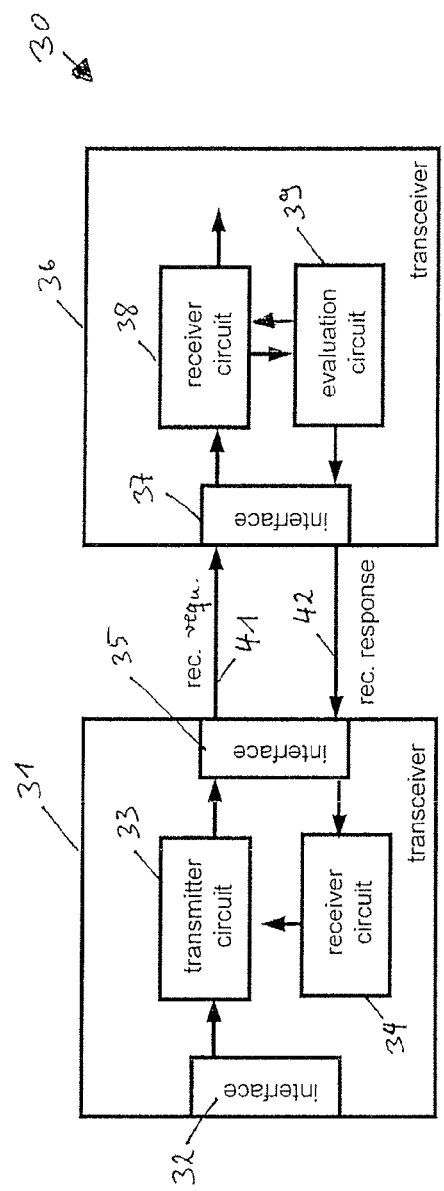
FIG. 2 is a schematic block diagram representation of a communication system according to another embodiment of the present invention.

FIG. 2 is a schematic block diagram representation of a communication system 30 according to one embodiment of the invention, the communication system 30 comprising a first transceiver 31 and a second transceiver 36. The first transceiver 31 and second transceiver 36 may, for example, be implemented as a transceiver pair, as were the first and second transceivers 12, 13 in the communication system 10 of FIG. 1.

The first transceiver 31 comprises a control interface 32 to receive information on new configuration parameters, a transmitter circuit 33, a receiver circuit 34, and a communications interface 35 to communicate signals to and to receive signals from the second transceiver 36. The second transceiver 36 comprises a communications interface 37 to receive signals from and to communicate signals to the first transceiver 31, a receiver circuit 38 and an evaluation circuit 39. In an exemplary mode of operation, the first transceiver 31 receives a signal including information on new configuration parameters or on bounds on new configuration parameters at the control interface 32, and the transmitter circuit 33 generates a reconfiguration request signal 41 based on the signal received at the control interface 32 and outputs the reconfiguration request signal 41 via the communications interface 35 to the second transceiver 36, the reconfiguration request signal 41 comprising information on the new configuration parameters or on bounds on new configuration parameters. In one embodiment, the reconfiguration request signal 41 output from the first transceiver 31 contains the same information as the signal received at the control interface 32. In another embodiment, a control circuit (not shown) of the first transceiver 31 may process the information on new configuration parameters received at the control interface 32 and may generate the reconfiguration request signal 41 based on the processed information.

The reconfiguration request signal 41 received at the communications interface 37 of the second transceiver 36 undergoes standard signal processing by the receiver circuit 38, and the information on the new configuration parameters or the bounds on new configuration parameters is evaluated by the evaluation circuit 39. In one embodiment, the evaluation circuit 39 determines whether the second transceiver 36 is capable of accommodating the new configuration parameters or suitable configuration parameters within the bounds specified by the reconfiguration request signal 41. The evaluation performed by the evaluation circuit 39 may be based on one or several of various other data sets that characterize, e.g., current configuration parameters, current transmission conditions, current operational parameters of the second transceiver 36, available ranges of operational parameters of the second transceiver 36, transmission conditions estimated for the new configuration parameters or similar parameters, as will be described in more detail below.

Based on a result of the evaluation, the evaluation circuit 39 generates a reconfiguration response signal 42 and outputs the reconfiguration response signal 42 via the communications interface 37 to the first transceiver 31. For example, when the evaluation circuit 39 determines that the second transceiver 36 cannot accommodate the new configuration parameters or the new bounds on configuration parameters, the evaluation circuit 39 generates a reconfiguration response signal 42 to indicate failure of the second transceiver 36 to accommodate the new configuration. When the evaluation circuit 39 determines that the second transceiver 36 is capable of accommodating the new configuration, it generates a reconfiguration response signal 42 which indicates that the new configuration can be accommodated. The reconfiguration response signal 42 may comprise further information. For example, in one embodiment, the reconfiguration response signal 42 may include information on a specific set of configuration parameters selected by the evaluation circuit 39 from a range of possible new configuration parameters.

In the first transceiver 31, the reconfiguration response signal is received and processed by the receiver circuit 34 which initiates a reconfiguration of the transmitter circuit 33 based on the reconfiguration response signal 42. In one embodiment, the transmitter circuit 33 is not adapted to a new configuration when the reconfiguration response signal 42 indicates that the second transceiver 36 is not capable of accommodating the new configuration. On the other hand, the transmitter circuit 33 is reconfigured when the reconfiguration response signal 42 indicates that the second transceiver 36 is capable of accommodating the new configuration.

In one embodiment, the transmitter circuit 33 and the receiver circuit 38 may be reconfigured synchronously. The term "synchronously" may refer to synchronization at the symbol or signal level. I.e., when the transmitter circuit 33 and the receiver circuit 38 are synchronously switched to a new configuration, the switching is respectively performed such that the receiver circuit 38 is switched to the new configuration when the first signal that is generated by the transmitter circuit 33 based on the new configuration is to be processed. Similarly, when the transmitter circuit 33 and/or the receiver circuit 38 comprise several functional sub-units, switching of these sub-units may be performed synchronously at the symbol level. To effect synchronous switching of the transmitter circuit 33 of the first transceiver 31 and of the receiver circuit 38 of the second transceiver 36 to the new configuration, a specific signal or signal sequence may be transmitted to initiate the switching to the new configuration, or switching may be performed upon transmission of a predetermined signal, e.g., a synchronization (sync) symbol.

It will be appreciated that the block diagram of FIG. 2 is only schematic and that the first and second transceivers 31, 36 may comprise other components as appropriate. For example, while the receiver circuit 34 is shown to directly provide a control signal to the transmitter circuit 33 of the first transceiver in the exemplary embodiment of FIG. 2, the first transceiver may comprise, e.g., a control circuit coupled to the receiver circuit 34 to receive data included in the reconfiguration response signal 42 and coupled to the transmitter circuit 33 to control the transmitter circuit 33 based on the data received. Similarly, the evaluation circuit 39 of the second transceiver 36 does not need to be directly coupled to the communications interface 37, but may also be coupled to the communications interface 37 via a transmitter circuit (not shown) of the second transceiver 36 to output the reconfiguration response signal. Further, the evaluation circuit 39 may also be coupled to the transmitter circuit (not shown) of the second transceiver 36 to reconfigure the transmitter circuit upon transmission of a corresponding reconfiguration request signal from the first transceiver 31 to the second transceiver 36, so as to reconfigure the transmission system 30 in the transmission direction from the second transceiver 36 to the first transceiver 31. In an exemplary embodiment, the transmitter circuit 31 of the first transceiver 31 and the receiver circuit 38 of the second transceiver 36 may be reconfigured independently from the receiver circuit 34 of the first transceiver 31 and the transmitter circuit (not shown) of the second transceiver 36. In one embodiment, both a reconfiguration of the transmitter circuit 33 of the first transceiver 31 and of the receiver circuit 38 of the second transceiver 36 and a reconfiguration of the receiver circuit 34 of the first transceiver 31 and of the transmitter circuit (not shown) of the second transceiver 36 may be initiated by transmitting a reconfiguration signal from the first transceiver 31 to the second transceiver 36.

Figure 3:
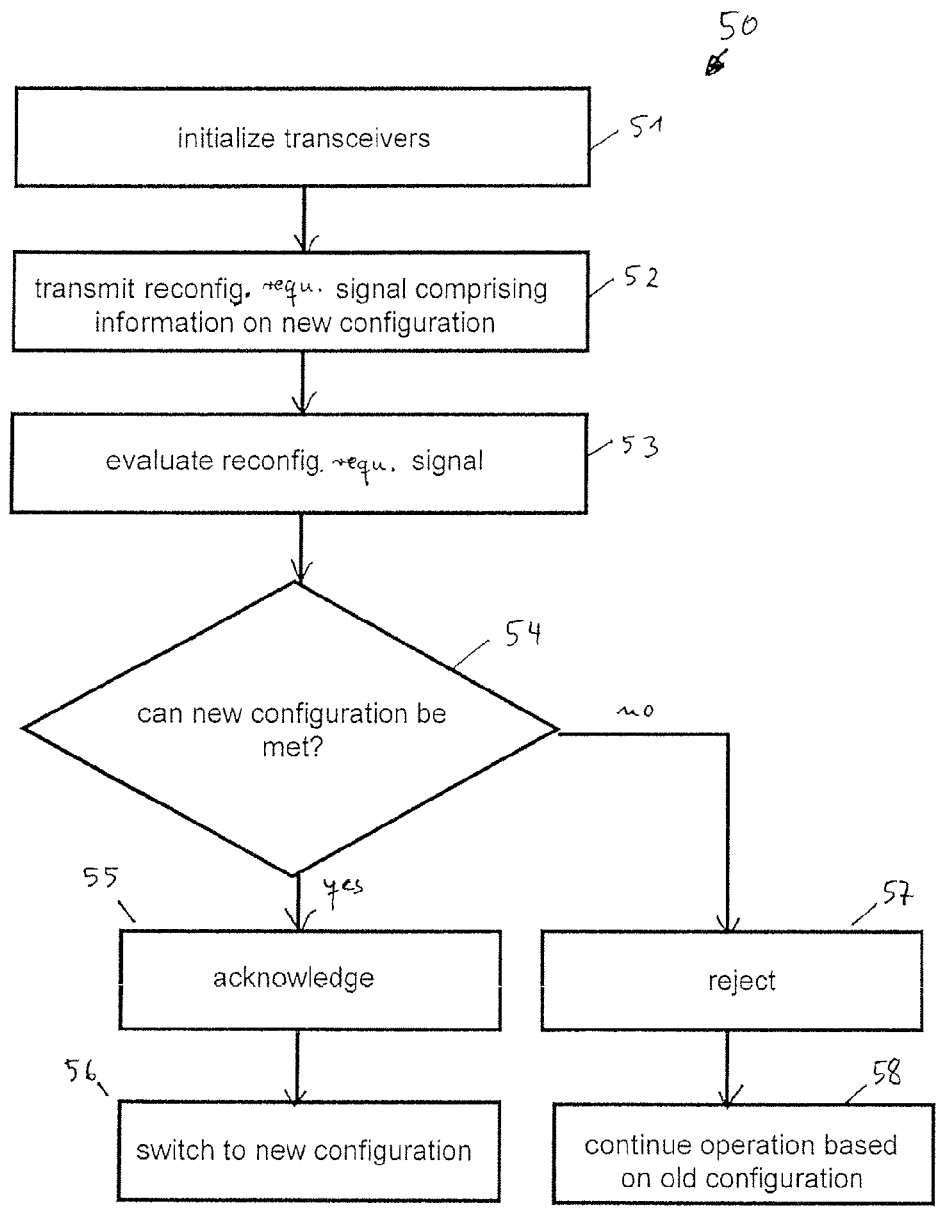
FIG. 3 is a flow diagram representation of a data transmission method according to one embodiment of the present invention.

FIG. 3 is a flow diagram representation according to one embodiment of a data transmission method. The method, which is generally indicated at 50, may, for example, be performed by the communication system 30 of the exemplary embodiment of FIG. 2. At 51, a first transceiver and a second transceiver are initialized. In the operational state of the first and second transceivers, at 52, a reconfiguration request signal is transmitted from the first transceiver to the second transceiver, the reconfiguration request signal comprising information on a new configuration, e.g., in the form of new configuration parameters or of bounds on new configuration parameters. For example, the reconfiguration request signal may comprise information on bounds of a new PSD. At 53, the reconfiguration request signal is evaluated at the second transceiver. At 54, it is determined whether the new configuration can be accommodated by the second transceiver. If, at 54, it is determined that the new configuration can be accommodated by the second transceiver, at 55, the new configuration is acknowledged by the second transceiver, and, at 56, both transceivers switch to the new configuration. If, at 54, it is determined that the new configuration cannot be accommodated by the second transceiver, at 57, the new configuration is rejected by the second transceiver and, at 58, both transceivers continue operation based on the old configuration.

Figure 4:
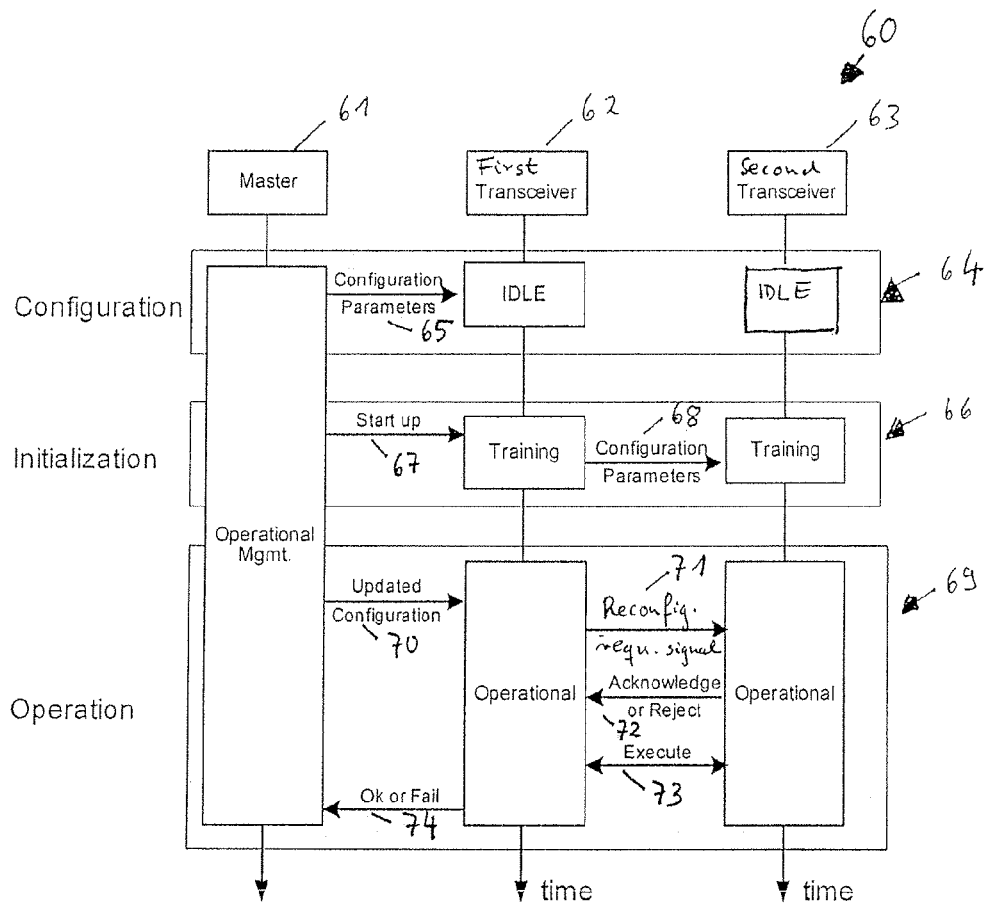
FIG. 4 is a schematic diagram illustrating a signal flow in a data transmission method according to one embodiment of the present invention.

FIG. 4 shows a schematic diagram 60 illustrating a signal flow in a communication system according to one embodiment of the present invention, the communication system 60 comprising a master controller 61, a first transceiver 62 coupled to the master controller 61 and a second transceiver 63 coupled to the first transceiver 62. The master controller 61 performs management functions such as determining a configuration for the first and second transceivers 62, 63 upon start up of the first and second transceivers 62, 63, or determining a new configuration during operation of the communication system 60. In one embodiment, the master controller 61 and first transceiver 62 may be installed in a central office, and the second transceiver 63 may be installed in customer premises with the first and second transceivers 62, 63 being interconnected by a copper wire pair. While not shown in FIG. 4, the communication system 60 may comprise a plurality of first and second transceivers with the master controller 61 performing management functions for said plurality of first and second transceivers.

Exemplary signal flows in a configuration phase 64, an initialization phase 66, and an operation phase 69 are explained with reference to FIG. 4. In the configuration phase 64, the master controller 61 provides a signal 65 including configuration parameters to the first transceiver 62 while the first and second transceivers 62, 63 are in an idle state. The configuration parameters provided as signal 65 may, for example, include an initial PSD. In the initialization phase 66, the master controller 61 communicates a start-up signal 67 to the first transceiver 67. In response thereto, the first transceiver 67 transmits the original configuration parameters 68 to the second transceiver 63. The first and second transceivers 62, 63 then undergo a training phase in which operational parameters of the transceivers are adapted within the bounds imposed by the configuration parameters 68. By way of illustration, but not limitation, the training phase during initialization may be implemented as a handshake phase between a pair of DSL modems.

In the showtime or live operational phase 69 of the transceivers 62, 63, when payload data is being transmitted between the first and second transceivers 62, 63, the data being generated is based on the original configuration parameters 68. When the master controller 61 determines that reconfiguring the first and second transceivers 62, 63 is desirable, it outputs a signal 70 including information on new configuration parameters to the first transceiver 62. As has already been explained above, the master controller 61 may output the signal 70 based on various criteria. In one embodiment, the master controller 61 outputs the signal 70 based on monitored transmission conditions between a plurality of first and second transceiver pairs. In one embodiment, the signal 70 is output to accommodate dynamically varying noise conditions due to cross-talk between data connections interconnecting different first and second transceiver pairs. However, the signal 70 may also be output based on other criteria, e.g., a change in service level for the respective subscriber. Based on the signal 70, the first transceiver 62 transmits a reconfiguration request signal 71 to the second transceiver 63 where the reconfiguration request signal 71 is evaluated. The reconfiguration request signal 71 may, for example, comprise information on new configuration parameters, such as a new PSD, or on bounds on configuration parameters, such as a new maximum PSD. Based on the reconfiguration request signal 71, a response signal 72 is generated by the second transceiver 63 for transmission to the first transceiver 62, the response signal 72 indicating whether the second transceiver accepts or acknowledges the new configuration (acknowledge) or rejects the new configuration. When the second transceiver 63 acknowledges the new configuration, the first and second transceivers 62, 63 synchronously execute the transition to the new configuration at 73. The transition to the new configuration is implemented synchronously at the symbol level, i.e., the first and second transceivers 62, 63 undergo the transition upon processing the same symbol. The transition 73 may be made at a predetermined time, e.g., upon transmission of a sync symbol. The first transceiver 62 then outputs a signal 74 to the master 61 to indicate a transition to the new configuration (an ok signal) or to indicate that the transition has failed (a failure signal). If the first and second transceivers 62, 63 have been reconfigured, operation of the first and second transceivers 62, 63 continues based on the new configuration parameters.

As may be seen from the schematic diagram of FIG. 4, according to one embodiment, the reconfiguration of the first and second transceivers 62, 63 may be achieved while the communication system is operational, i.e., without a long interruption of data transmission services between the first and second transceivers 62, 63.

It will be understood that, while only one reconfiguration is schematically indicated in FIG. 4, the reconfiguration of the first and second transceivers 62, 63 may be repeated when required, so that the first and second transceivers 62, 63 may be repeatedly reconfigured for operation under a variety of different configuration parameters.

Figure 5:
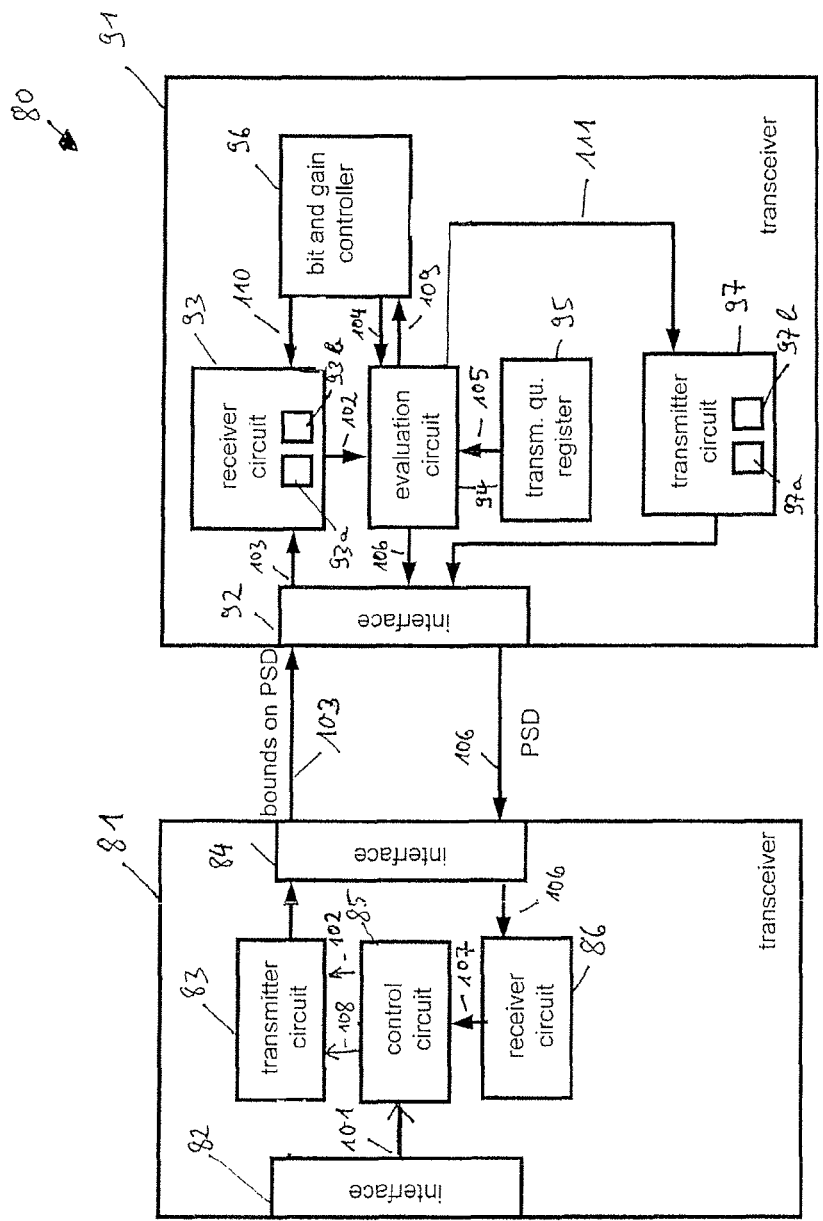
FIG. 5 is a schematic block diagram representation of a communication system according to another embodiment of the present invention.

FIG. 5 is a schematic block diagram representation of a communication system 80 according to another embodiment of the invention. The communication system 80 shown in FIG. 5 is based on the communication system 30 of the exemplary embodiment of FIG. 2, but additional components are shown in the drawing to explain the operation of the communication system 80 in more detail. The communication system 80 comprises a first transceiver 81 and a second transceiver 91. In an exemplary embodiment, the first transceiver 81 is installed in a central office, while the second transceiver 91 is installed in customer premises. In one embodiment, the first transceiver is coupled to a master controller (not shown) similar to the one shown in FIGS. 1 and 4.

The first transceiver 81 comprises a control interface 82 to receive a signal containing information on a new configuration from the master controller, a transmitter circuit 83, a communications interface 84 to communicate signals to the second transceiver 91, a control circuit 85 coupled to the transmitter circuit 83 to control a configuration of the transmitter circuit 83, and a receiver circuit 86 coupled to the control circuit 85 to provide data to the control circuit 85. For illustrative purposes only, it will be assumed that the transmitter circuit 83 generates DMT signals.

The second transceiver 91 comprises a communications interface 92 to receive data from the first transceiver 81 and to communicate data to the first transceiver 81, a receiver circuit 93, an evaluation circuit 94 coupled to the receiver circuit 93, a register 95 to store an indicator of a transmission condition and coupled to the evaluation circuit 94, a bit and gain controller 96 coupled to the receiver circuit 93 and to the evaluation circuit 94, and a transmitter circuit 94. The receiver circuit 93 and the transmitter circuit 97 each may comprise a plurality of logical sub-units 93a, 93b and 97a, 97b, only two of which are schematically indicated. Similarly, the transmitter circuit 83 and the receiver circuit 86 of the first transceiver 81 may respectively comprise a plurality of logical sub-units (not shown in FIG. 5).

An exemplary mode of operation of the communication system is explained with reference to FIG. 5, assuming that the communication system initially already is in an operation state. When a reconfiguration of the first and second transceivers is required, information on new configuration parameters is received as a signal 101 at interface 82 of the first transceiver 81. Based on the signal 101, the control circuit 85 inputs data 102 to the transmitter circuit 83 to control the transmitter circuit 83 to generate and communicate a reconfiguration request signal 103. In one embodiment, the data 102 may be identical to the data 101 received from the master controller. In another embodiment, the control circuit may process the data included in the signal 101 to generate the signal 102. For example, when the master system provides data 101 indicative of a maximum PSD, e.g., in the form of parameters that specify the maximum PSD as a function of frequency, the control circuit 102 may determine the scaling factors for every tone of the spectrum and may provide the scaling factors as data 102 to the transmitter circuit 83 which generates the reconfiguration request signal 103 based on the data 102. The reconfiguration request signal 103 may comprise one or several DMT symbols, each of which may also comprise further data, e.g., payload data. In one embodiment, the data 102 is transmitted to the second transceiver 91 via an overhead channel for control information, e.g., an overhead channel of an ADSL2/ADSL2+ standard.

After processing the reconfiguration request signal 103 to retrieve the data 102, the receiver circuit 93 of the second transceiver 91 transmits the data 102 to the evaluation circuit 94. The evaluation circuit 94 retrieves data 105 related to a transmission condition or transmission condition parameters from the register 95, the transmission condition parameters stored in the register 95 quantifying a transmission condition from the first transceiver 81 to the second transceiver 91 for the present configuration. In one embodiment, the data 105 includes signal to noise ratios (SNRs) for different tones of the DMT spectrum as determined during transceiver training in an initialization phase. Based on the data 105, information on the current configuration parameters and the information on new configuration parameters contained in data 102, the evaluation circuit may estimate values for transmission condition parameters anticipated for the new configuration parameters. In one embodiment, the evaluation circuit extrapolates the transmission condition parameters stored in register 95 to estimate the anticipated new transmission condition parameters. In one embodiment, the extrapolation may be linear in the scaling factors of the tones of the DMT spectrum. In various embodiments, more complex models may be employed to estimate the new transmission condition parameters, e.g., taking into consideration inter-symbol interference.

When the evaluation circuit 94 determines, based on the estimated new transmission condition parameters, that the second transceiver 91 is not capable of accommodating the new configuration parameters, it sends a fail signal 106 via interface 92 to the first transceiver 81 to indicate that the reconfiguration may not be effected. If the evaluation circuit 94 determines that the second transceiver 91 is capable of accommodating the new configuration parameters, it sends the signal 106 via interface 92 to the first transceiver 81 to acknowledge that the reconfiguration may be effected. In an exemplary embodiment, the evaluation circuit 94 determines new bit allocation values Bi and gain values Gi for every tone i of the DMT spectrum and provides the new Bi and Gi values 109 to the bit and gain controller 96, and further includes the new Bi and Gi values in the acknowledge signal 106 for transmission to the first transceiver 81. After retrieving the new Bi and Gi values 107 from the signal 106, the receiver circuit 86 of the first transceiver 81 provides the new Bi and Gi values 107 to the control circuit 107 of the first transceiver.

At a predetermined time, the control circuit 85 controls the transmitter circuit 83 of the first transceiver 81 to generate signals based on the new Bi and Gi values determined by the evaluation circuit 94 of the second transceiver 96. In an exemplary embodiment r the control circuit 85 provides a control signal 108 to the transmitter circuit 83 or to a plurality of configurable sub-units of the transmitter circuit 83 to effect the change to the new Bi and Gi values. Synchronously with the reconfiguration of the transmitter circuit 83 of the first transceiver 81r the bit and gain controller 96 directs the receiver circuit 93 of the second transceiver 91 to reconfigure the receiver circuit 93 to the new Bi and Gi values r i.e., to the new PSD. In one embodiment r the transmitter circuit 83 of the first transceiver 81 and the receiver circuit 93 of the second transceiver 91 may be switched to the new PSD when a sync symbol is transmitted r or switching may be initiated by transmission of a specific symbol sequence.

According to one exemplary embodiment r switching of the transmitter circuit 83 and of the receiver circuit 93 to the new configuration may be achieved without a dedicated training phase. In one embodiment r operational parameters of the transmitter circuit 83 and of the receiver circuit 93 may be adapted to the new configuration by extrapolation from current operational parameters. In another embodiment, the transmitter circuit 83 and the receiver circuit 93 may be trained utilizing predefined DMT symbols that are transmitted from the first transceiver 81 to the second transceiver 91, e.g., sync symbols, as will be explained more fully below.

While only a reconfiguration for signal transmission from the first transceiver 81 to the second transceiver 91 has been described so far r the reconfiguration of the transmitter circuit 97 of the second transceiver 91 and of the receiver circuit 86 of the first transceiver 81 may also be initiated by the first transceiver 81. For example, upon receiving information on a new PSD from the master controller at interface 82, the control circuit 85 of the first transceiver 81 may determine new bit allocation values and gain values for the data transmission direction from the second transceiver 91 to the first transceiver 81 and may transmit these new values to the second transceiver 91. In the second transceiver 91, the evaluation circuit 94 reconfigures the transmitter circuit 97 to the new bit allocation and gain values. Upon transmission of the next sync symbol, or at another pre-defined time, the receiver circuit 86 of the first transceiver 81 and the transmitter circuit 97 of the second transceiver 91 switch to the new configuration. In one embodiment, the PSDs for upstream and downstream data transmission directions may be changed independently from one another.

Figure 6:
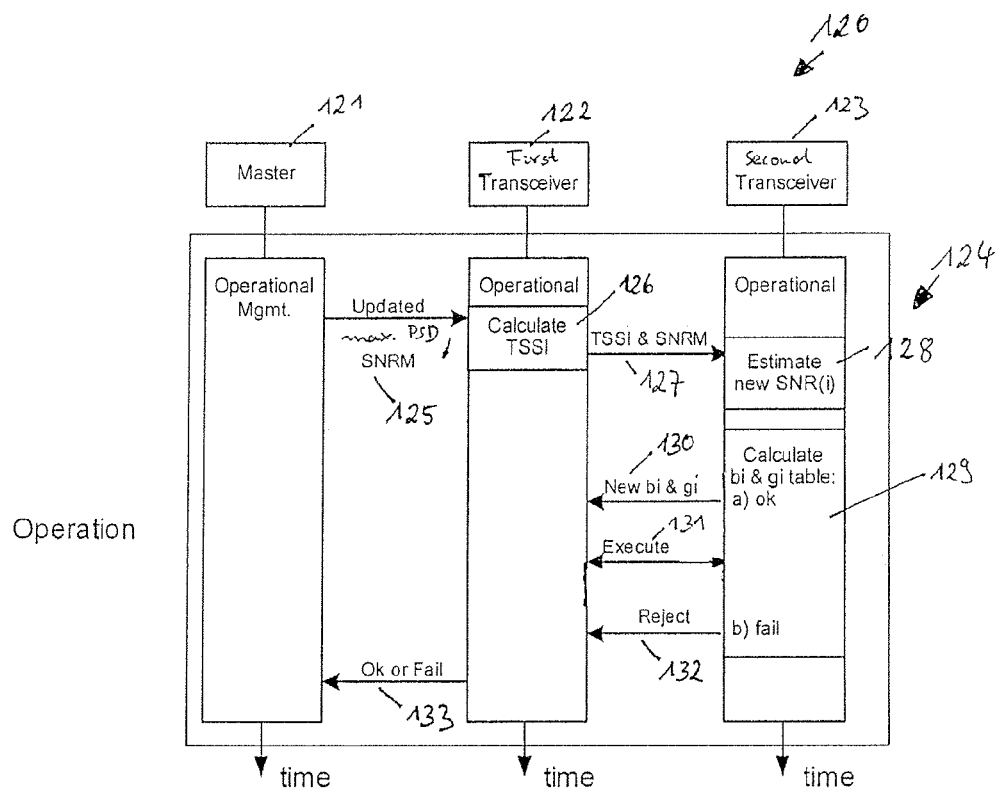
FIG. 6 is a schematic diagram illustrating a signal flow in a data transmission method according to another embodiment of the present invention.

FIG. 6 is a schematic diagram illustrating a signal flow in a communication system 120 according to another exemplary embodiment. The communication system 120 comprises a master controller 121, a first transceiver 122 and a second transceiver 123. In one embodiment, the first and second transceivers 122, 123 may be implemented in the same manner as the transceivers 81, 91 of the communication system 80 of the embodiment of FIG. 5. The master controller 121 and the first transceiver 122 may be installed in a central office, while the second transceiver 123 may be installed in customer premises. In an operation phase 124, the master controller 121 communicates a signal 125 to the first transceiver 122 when a reconfiguration of the first and second transceivers 122, 123 is desired, the signal 125 including information on a new maximum PSD and a new SNRM. Based on this information, the first transceiver 122 determines new scaling factors (transmitted signal strength indication, TSSI) for each tone of a DMT spectrum, as schematically shown at 126, and transmits a signal 127 including information on the TSSI values and the new SNRM to the second transceiver 123. In one embodiment, the signal 127 is transmitted via an overhead channel. Based on signal 127, the second transceiver 123 estimates new signal to noise ratios for each tone of the DMT spectrum, as schematically shown at 128 and, at 129, calculates a new bit allocation value and gain value table, as indicated at 129. Depending on whether the second transceiver 123 is capable of accommodating the new configuration, the new bit allocation value and gain value table is transmitted to the first transceiver as signal 130 and the reconfiguration is executed at 131, or the second transceiver 123 rejects the new configuration at 132. The first transceiver 122 communicates a signal 133 to the master controller 121 to indicate that the reconfiguration has been effected or that the reconfiguration has failed.

While specific exemplary implementations of communication systems and transceivers according to various embodiments have been explained above, it is to be understood that all block diagrams of such devices and systems shown in the drawings are only exemplary and that other functional units may be included as appropriate. For example, while not shown in FIGS. 2 and 5, the first and second transceivers 31, 36 and 81, 91, respectively, may also include monitoring circuits to monitor time-varying signal transmission conditions similar to the monitoring circuits explained with reference to FIG. 1. Further, while various functional sub-units of the transceivers explained above are shown as separate entities in the drawings for illustrative purposes, any circuit or functional unit shown in the drawings may be comprised of several functional sub-units. For example, in one embodiment, the transmitter and receiver circuits may respectively comprise a circuit to perform analog signal processing, e.g., analog filtering and A/D conversion, and a further circuit to perform various digital signal processing functions. Further, the various circuits, registers or other units explained with reference to FIGS. 1-6 above may also be integrally formed. By way of illustration, but not limitation, in one embodiment, digital signal processing paths of the transmitter circuit 83, of the receiver circuit 86 and of the control circuit 85 of the first transceiver 81 of the embodiment of FIG. 5 may be implemented as a single integrated circuit.

Figure 7:
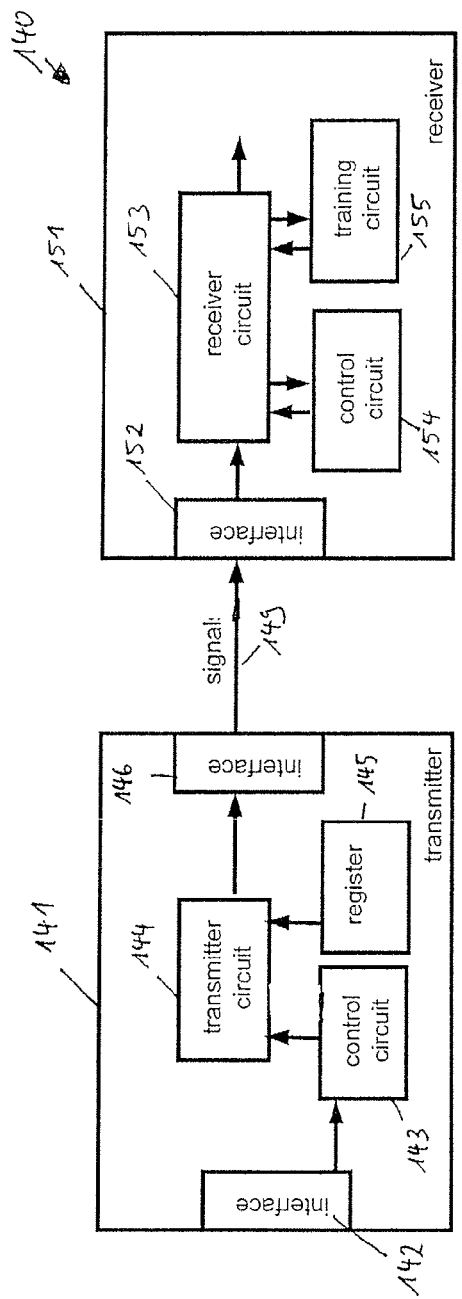
FIG. 7 is a schematic block diagram representation of a communication system according to another embodiment of the present invention.

With reference to FIG. 7, a communication system 140 according to another embodiment of the present invention is explained. The communication system 140 comprises a transmitter 141 and a receiver 151. While not shown in FIG. 7, the communication system 140 may further comprise a master controller coupled to the transmitter 141 to provide information on a new configuration to the transmitter 141 via a control interface 142. In one embodiment, the information on the new configuration may be based on a monitored transmission condition between a plurality of transmitters and receivers.

The transmitter 141 comprises the control interface 142, a transmitter circuit 144 to generate a signal based on data, a control circuit 143 to control a configuration of the transmitter circuit 144, a register 145 to store pre-defined data and to provide the pre-defined data to the transmitter circuit 144, and a communications interface 146 coupled to the transmitter circuit 144 to transmit signals generated by the transmitter circuit 144 to the receiver 151. The transmitter circuit 144 is configurable, i.e., it may be set to one of several different configurations to generate signals having different characteristics. By way of illustration, but not limitation, when the transmitter circuit 144 generates DMT signals, the different configurations may correspond to different PSDs, different tone spacing, different numbers of tones or similar. As will be explained in more detail below, upon receiving information on a new configuration via interface 142, in one embodiment the control circuit 143 may reconfigure the transmitter circuit 144 from the present working, showtime configuration to a new configuration when a signal is generated from the predetermined data stored in register 145, and subsequently reconfigured back to the original operational, showtime configuration.

The receiver 151 comprises a communications interface 152 to receive the signal 149 transmitted from the transmitter 141, a receiver circuit 153 to process the signal, a control circuit 154 to control a configuration of the receiver circuit 153, and a training circuit 155 to train the receiver circuit 153. The receiver circuit 153 is configurable, i.e., it may be set to one of several different configurations to process signals 149 having different characteristics. By way of illustration, but not limitation, when the receiver circuit 153 processes DMT signals, the different configurations may correspond to different PSDs, different tone spacings, different numbers of tones, or similar variations. As will be explained in more detail below, in one embodiment the control circuit 154 may reconfigure the receiver circuit 154 from the present showtime configuration to the new configuration when a signal generated from the predetermined data stored in register 145 is processed, and subsequently back to the present showtime configuration. In one exemplary embodiment, the training circuit 155 trains the receiver circuit 153 when the receiver circuit 153 is in the new configuration, i.e., processes a signal generated from the predetermined data. As used herein, the term "training" refers to an adaptation of operational parameters of the respective unit to adapt operation of the unit to a new configuration.

The following describes an exemplary mode of operation of the communication system 140. It will be assumed that the transmitter 141 and the receiver 151 are in an operational, showtime state and are respectively in a first configuration corresponding, e.g., to a first PSD. When a master controller determines that a reconfiguration of the transmitter 141 and the receiver 151 is desirable, information on the new configuration, e.g., a new PSD, is input to transmitter 141 at control interface 142 and is provided to the control circuit 143. The control circuit 143 stores the information on the new configuration and also provides the information to the transmitter circuit 144 for transmission to the receiver 151, e.g., utilizing an overhead channel. In the receiver 151, the information on the new configuration is provided to and stored by the control circuit 154.

After transmission of the information on the new configuration to the receiver 151, a retraining phase is initiated. In one embodiment, the retraining phase may be initiated by transmission of a specific flag or control information. In another embodiment, the transmitter 141 and receiver 151 may automatically initiate the retraining phase after transmission of the new configuration parameters.

In the retraining phase, the transmitter circuit 144 may remain in the first configuration when generating signals carrying payload data or specific types of control signals. However, the control circuit 143 switches the transmitter circuit 144 to a second Configuration—corresponding to the new configuration to which the transmitter is to be Reconfigured—when signals generated from the pre-defined data stored in register 145 are generated and output. In one exemplary embodiment, the signals generated based on the data in register 145 may correspond to sync symbols. In another embodiment, the data in register 145 may correspond to payload data that has been previously transmitted and is retransmitted. Similarly, the receiver circuit 153 of the receiver 151 may remain in the first configuration when processing signals carrying payload data, while the control circuit 154 may switch the receiver circuit 153 to the second configuration when the signals generated form the pre-defined data are processed. Thus, the transmitter circuit 144 and the receiver circuit 153 may be repeatedly and synchronously switched between the first and second configurations to retrain the transmitter 141 and the receiver 151 for the new, i.e., second configuration. After the retraining phase is completed, the transmitter 141 and receiver 151 synchronously switch to the new configuration.

A data transmission method according to an exemplary embodiment is explained with reference to FIG. 8, which is a flow diagram representation of the method generally indicated at 160. At 161, a transmitter and receiver are initialized. In one embodiment, the initialization may include training the transmitter and receiver for an original configuration, e.g., an original PSD. At 162, the transmitter and receiver are operational and signals generated based on the original PSD are transmitted from the transmitter to the receiver. At 163, information on the new PSD is provided to the transmitter and the receiver. At 164, retraining of the communication system is started, with the retraining being performed on symbols that correspond to predetermined data and are generated based on the new PSD. At 165, the transmitter and receiver switch to the new PSD.

According to one embodiment, in the retraining started at 164, only selected signals are generated based on the new PSD, while other signals continue to be generated based on the old PSD. The selected signals may, e.g., be sync symbols that are utilized to synchronize operation of the transmitter and receiver. In other embodiments r the selected signals may include predetermined data. As used in connection with the embodiments of FIGS. 7 and 8, the term "predetermined data" refers to data that is known to the receiver even before transmission of the signal, e.g., because the data corresponds to a fixed sequence of values as utilized in various control signals, or because the data has been previously transmitted as in the case of payload data that is retransmitted. The predetermined data does not need to be fixed r but may vary between successive signals that are generated based on the new PSD.

Figure 8:
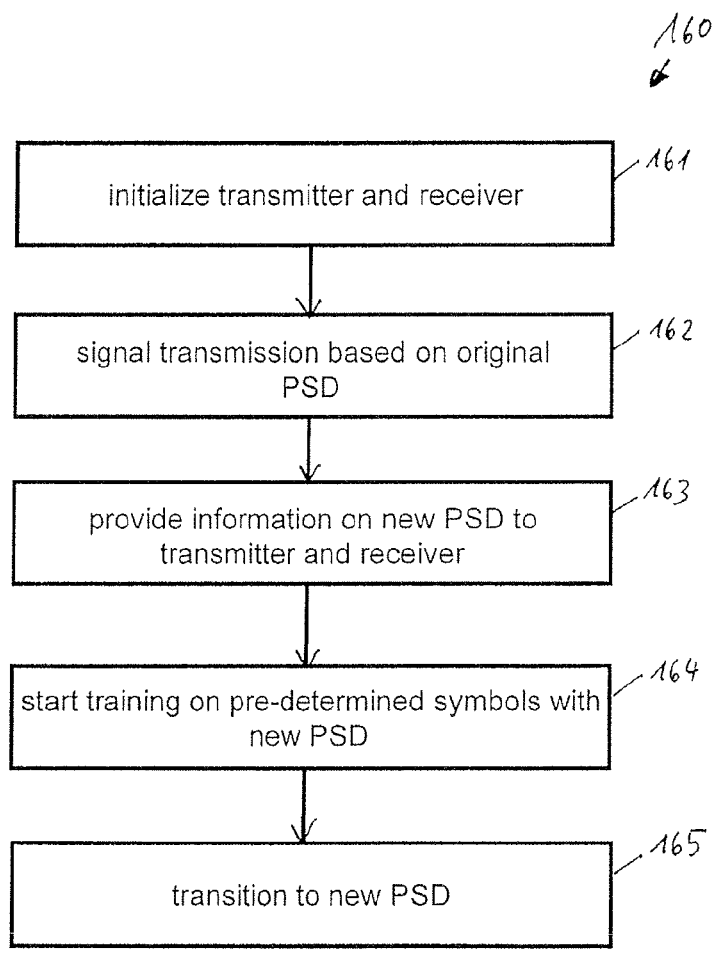
FIG. 8 is a flow diagram representation of a data transmission method according to another embodiment of the present invention.
Figure 9A:
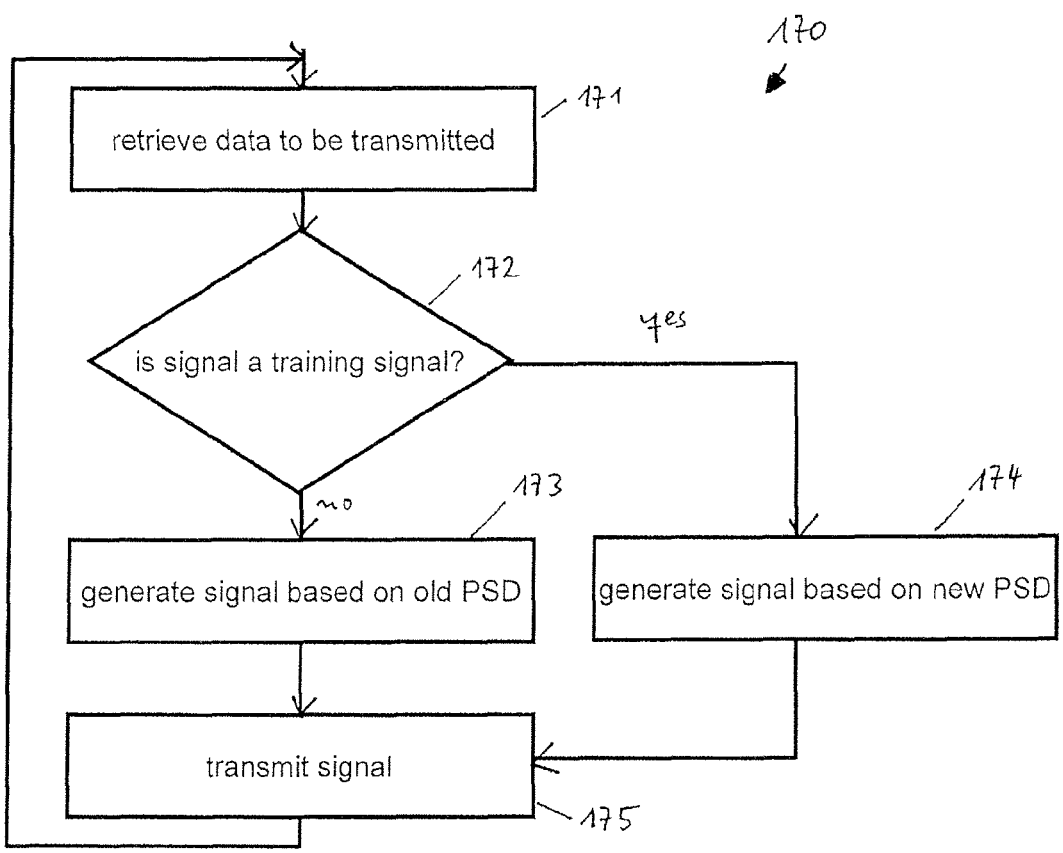
FIGS. 9A and 9B are flow diagram representations of data transmission methods according to embodiments of the present invention.

FIG. 9A is a flow diagram representation of a data transmission method 170 according to another embodiment of the invention. The method 170 may, for example, be employed in the method 160 of FIG. 8 to implement the training process started at 164.

At 171, data to be transmitted is retrieved, e.g., from a buffer buffering payload data or from a register or other memory which stores predetermined data, such as data corresponding to a sync symbol. At 172, it is determined whether the signal to be generated and transmitted is a training signal. If it is determined that the signal is a training signal, at 174, the signal is generated based on a new PSD and, at 175, is transmitted. If the signal is determined to be not a training signal, at 173, the signal is generated based on the old PSD, i.e., the PSD for which the transmitter and receiver are presently configured and, at 175, the signal is transmitted. In one embodiment, at least one signal generated based on the old PSD is transmitted before transmission of one of the training signals, and another signal generated based on the old PSD transmitted after transmission of this training signal. In one embodiment, a plurality of training signals may be transmitted, a predetermined number of signals that are not training signals being transmitted in between successive training signals or in between subsequences of training signals. In other words, according to one embodiment, the generation of the signals may be repeatedly and periodically switched between the old and new PSDs in the retraining phase.

Figure 9B:
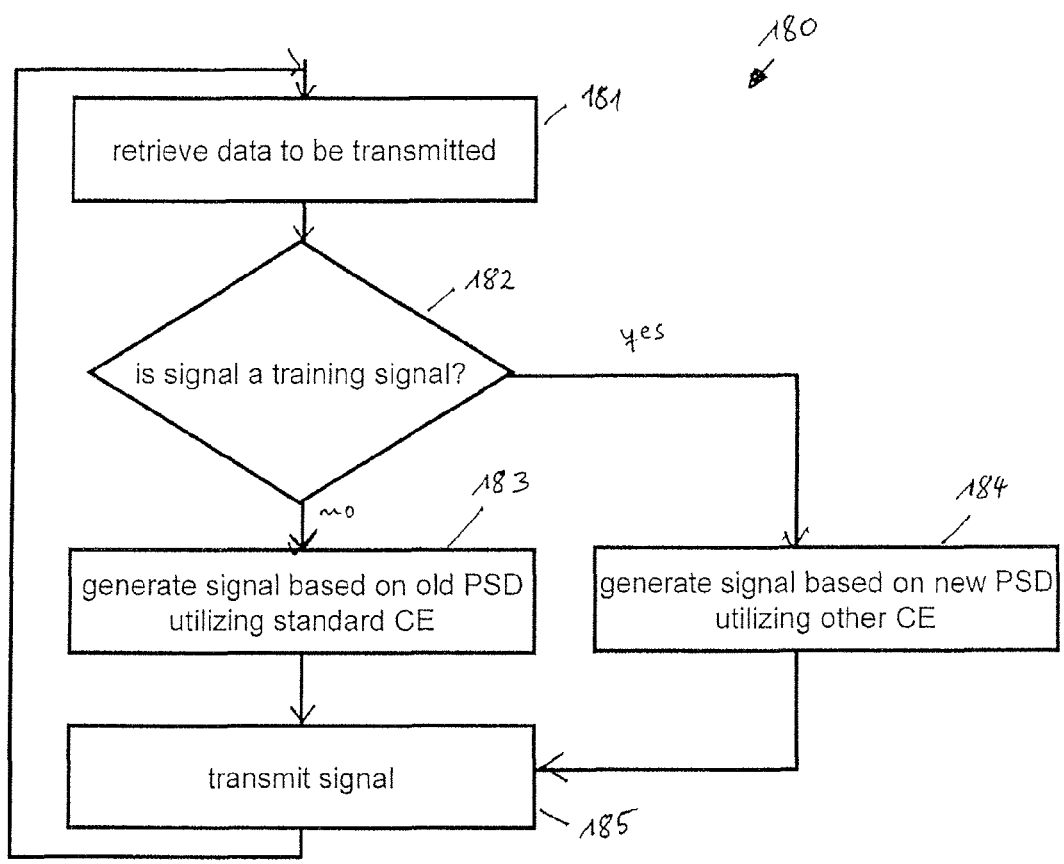

FIG. 9B is a flow diagram representation of a data transmission method 180 according to another embodiment of the invention, which is based on the method 170 of FIG. 9A. At 181, data to be transmitted is retrieved, e.g., from a buffer buffering payload data or from a register or other memory which stores predetermined data, such as data corresponding to a sync symbol. At 182, it is determined whether the signal to be generated and transmitted is a training signal. If the signal is no training signal, it is generated based on the old PSD and so as to have a cyclic extension (CE) of a given length, e.g., the cyclic extension length for which the transmitter has been originally trained. When the signal is a training signal, at 184 the signal is generated based on the new PSD and having a cyclic extension length that is different from the given length of the non-training signal cyclic extension. In other words, in the method 180 of the exemplary embodiment of FIG. 9B, both the PSD and the cyclic extension length are switched between training signals and non-training signals. In one embodiment, the cyclic extension may have an increased length when a training signal is generated. Similar to the method of FIG. 9A, in the retraining phase the generation of the signals may be repeatedly and periodically switched between the old and new PSDs and, in combination therewith, between the two different cyclic extension lengths. As used herein, the term cyclic extension may include a cyclic prefix and/or a cyclic suffix. The term "cyclic extension" as used herein refers to any repetition of a part of a signal before and/or after the main part of the signal, i.e., before and/or after the part carrying payload data.

It will be appreciated that, in the methods 160, 170, and 180 of FIGS. 8, 9A, and 9B, respectively, the old PSD and given cyclic extension length may be different from the PSD and cyclic extension length of the configuration established upon initialization. The PSD and cyclic extension length may be the PSD and cyclic extension length corresponding to a preceding reconfiguration of the communication system. In other words, the methods 160, 170, and 180 may also be employed for repeated reconfiguration.

Figure 10A:
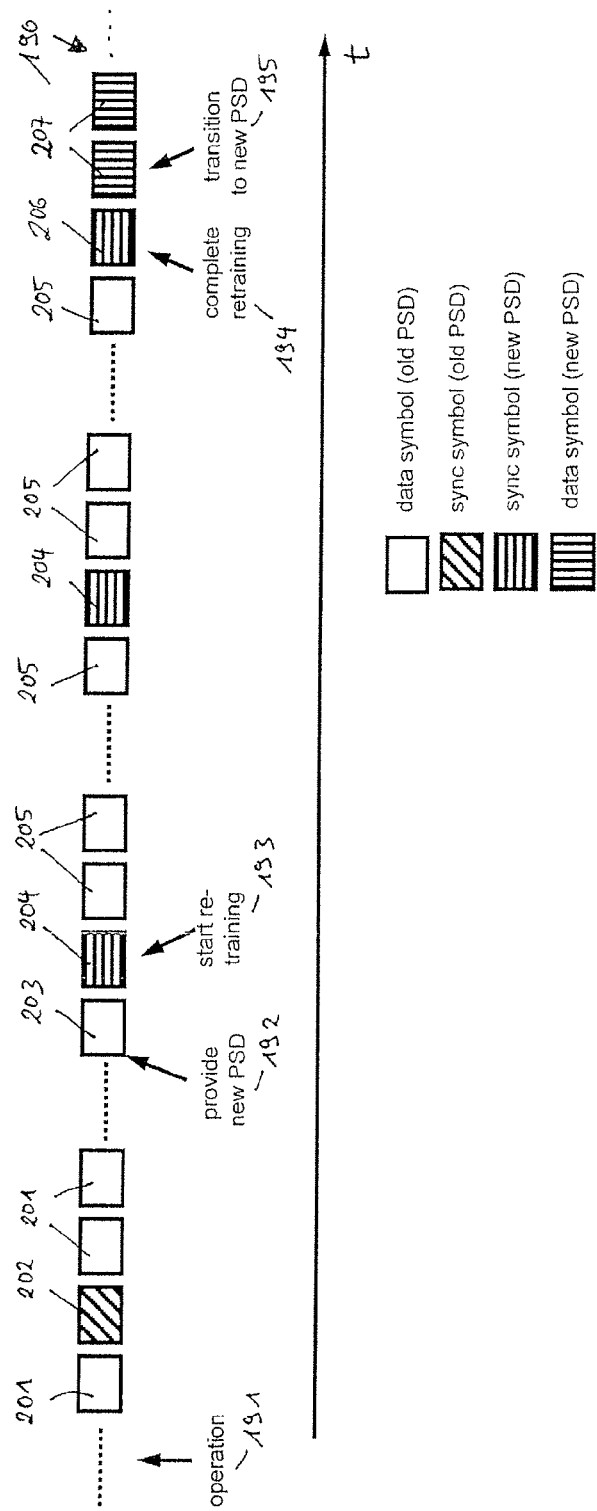
FIGS. 10A and 10B are schematic representations of symbols transmitted in data transmission methods according to embodiments of the present invention.

FIG. 10A is a schematic representation of a sequence of signals transmitted from a transmitter to a receiver in a data transmission method of, e.g., the exemplary embodiment of FIG. 9A. The sequence of signals is shown as a function of time. The signals, for example, may be OFDM symbols or DMT symbols. In an operation state 191, data symbols 201 are generated based on an "old" PSD, i.e., a PSD that corresponds to the presently active configuration of the communication system, sync symbols 202 also being generated based on the old PSD and being periodically transmitted to effect synchronization of transmitter and receiver operation. At a time 192, information on a new PSD is provided to the transmitter and to the receiver utilizing, e.g., a channel of data symbol 203. By providing the new PSD, the retraining phase is initiated and starts upon transmission of a sync symbol at 193. In the retraining phase, sync symbols 204 are generated based on the new PSD, while data symbols 205 are still generated based on the old PSD. In other words, the PSD is switched from the old PSD to the new PSD when a sync symbol 205 is transmitted, and back to the old PSD after transmission of the sync symbol. As will be explained in more detail below/the components of the communication system are trained for the new PSD based on the symbols that are generated using the new PSD, i.e., training is performed on the sync symbols 204. At 194/the retraining is completed. Retraining may be completed when, e.g., a predefined number of symbols having the new PSD has been transmitted, or when the training of the communication system components have sufficiently converged or meet predefined quality standards. After completion of the retraining/data symbols 207 also may be generated based on the new PSD, i.e., the communication system is fully switched to the new PSD.

Figure 10B:
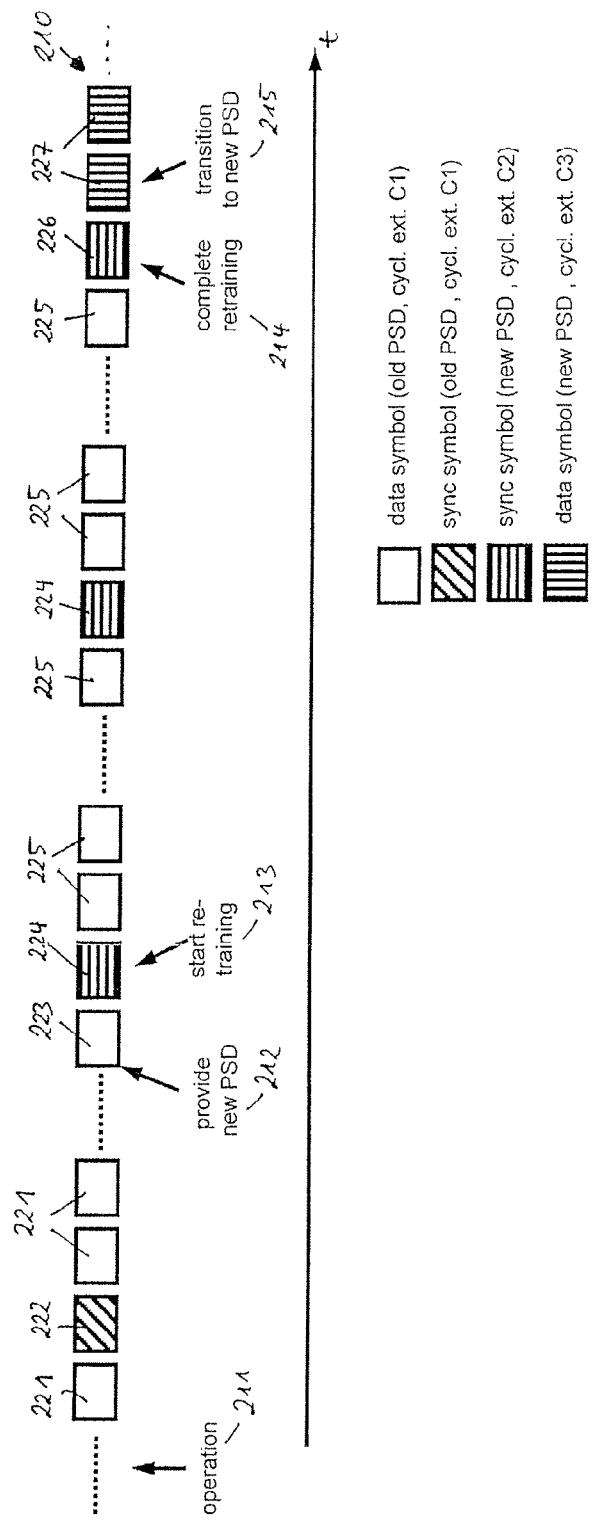

FIG. 10B is a schematic representation of a sequence of signals transmitted from a transmitter to a receiver in a data transmission method of, e.g., the exemplary embodiment of FIG. 9B, and is generally similar to the sequence of FIG. 9A. One difference between the sequences of FIG. 9A and FIG. 10B is that, in the retraining phase starting at 213 and completed at 214, sync symbols 224 are generated based on a new PSD and have a cyclic extension of length C2 different from a cyclic extension length C1 of the data symbols 225 in the retraining phase. After completion of the retraining at 214/the communication system fully switches to the new PSD, i.e., also the data symbols 227 are generated based on the new PSD. The cyclic extensions of the data symbols 227 and of the sync symbols after completion of retraining have a length C3 which may be identical to C1 or C2, or which may be different from C1 and C2.

Figure 11:
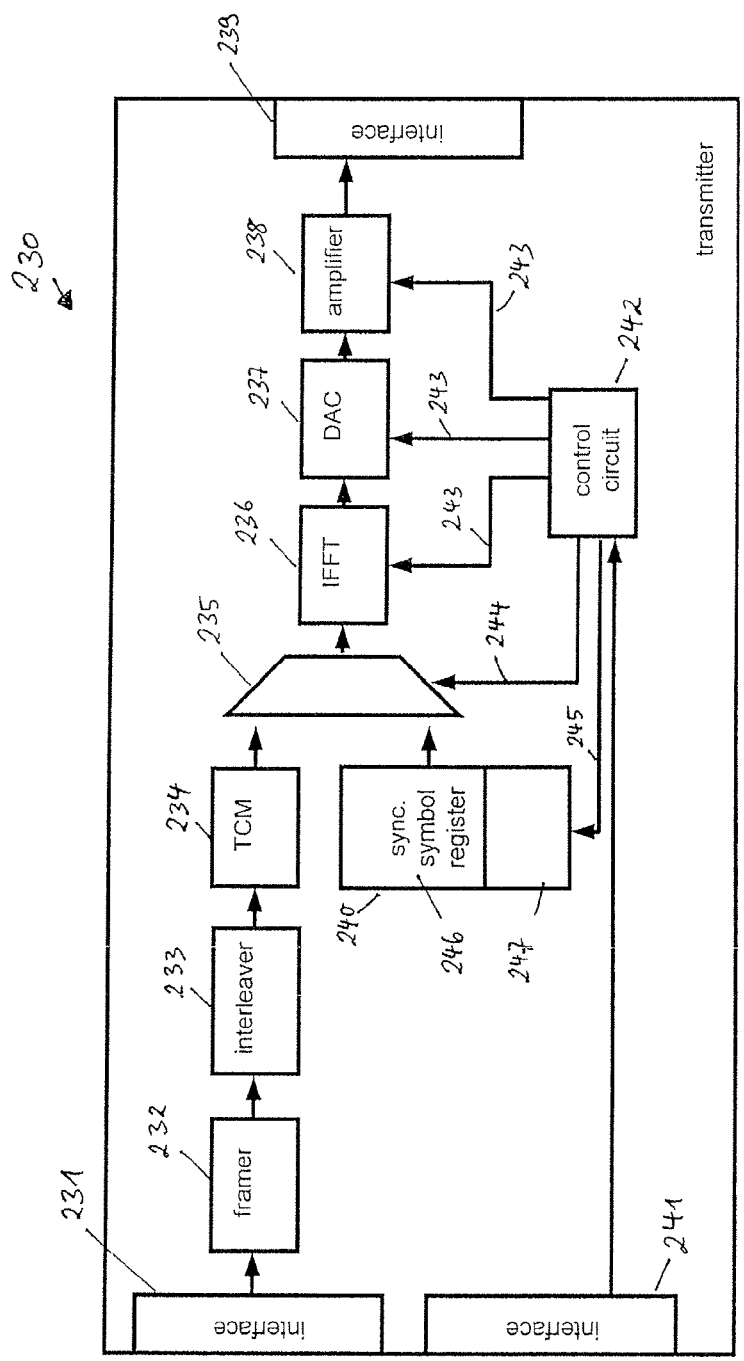
FIG. 11 is a schematic block diagram representation of a transmitter according to one embodiment of the present invention.

FIG. 11 is a schematic block diagram representation of a transmitter 230 according to an exemplary embodiment of the present invention. The transmitter may be utilized, e.g., as transmitter 141 in the communication system 140 of FIG. 7. The transmitter 230 comprises an interface 231 to receive data, e.g., from a subscriber terminal computer or a wide area network, and a transmitter circuit coupled to the interface 231 to generate a signal based on the data. The transmitter circuit comprises a framer 232 to frame the data, an interleaver 233 to interleave the framed data, a trellis code modulator 234 to perform trellis coding, a multiplexer 235, an inverse fast Fourier transform (IFFT) unit 236, a digital-to-analog (D/A) converter 237, and an amplifier 238. While one input of the multiplexer 235 is coupled to an output of the trellis code modulator 234, another input is coupled to a register 240 which stores predetermined data, e.g., data corresponding to a sync symbol. Signals generated by the transmitter circuit are output at an interface 239. It will be appreciated that the functional units shown in FIG. 11 are only exemplary, and that other functional units, e.g., data buffers, a Reed-Solomon coder, filters etc., may be included in the transmitter circuit. Further, the various functional blocks are shown as separate entities only for illustrative purposes, with it being understood that several or all of these elements may also be implemented in a single integrated circuit or a plurality of integrated circuits.

The transmitter 230 further comprises a control interface 241 to receive information on a new configuration, e.g., from a master controller installed in a central office. In one embodiment, the master controller monitors noise conditions of a plurality of cables, e.g., cables in one binder, and manages the PSD for a plurality of transmitter-receiver pairs based on the monitored noise conditions. The transmitter further comprises a control circuit 242 coupled to the interface 241 to receive the information on the new configuration, e.g., on a new PSD. After the information on the new PSD has been received, the control circuit 242 provides control signals 243 to various components of the transmitter 230, namely the IFFT unit 236, the D/A-converter 237 and the amplifier 238 in the exemplary embodiment of FIG. 11 to switch these components between two different operation states depending on whether a signal is to be generated based on the old PSD or based on the new PSD. The control circuit 242 is further coupled to the multiplexer 235 to control the active multiplexer input via a control signal 244 and to the register 240 to control communication of the predetermined data from the register 240 to the multiplexer using a control signal 245.

In one embodiment, the IFFT unit 236, the D/A-converter 237 and the amplifier 238 are controlled to generate a signal based on the new PSD when the active multiplexer input is the input coupled to the register 240, i.e., the predetermined data is to be transmitted. In one embodiment, the register 240 comprises a first portion 246 to store sync symbol data and a second portion 247 to store copies of the sync symbol data for a cyclic extension, and the control circuit 242 controls the register 240 to output data only from the first portion or from both the first portion and the second portion to the multiplexer 235 to accommodate different cyclic extension lengths. In this manner, the transmitter 230 of the exemplary embodiment of FIG. 11 may be employed to switch a PSD, with or without also switching a cyclic extension length, depending on whether or not a training signal is to be transmitted, as illustrated for the various embodiments explained with reference to FIGS. 8-10 above.

While not shown in FIG. 11, the transmitter 230 of FIG. 11 may also include a training circuit that is coupled to several of the functional units or blocks of the transmitter circuit to adapt operational parameters of these functional units when signals are generated based on the new PSD, thereby training the transmitter 230 for the new PSD.

Figure 12:
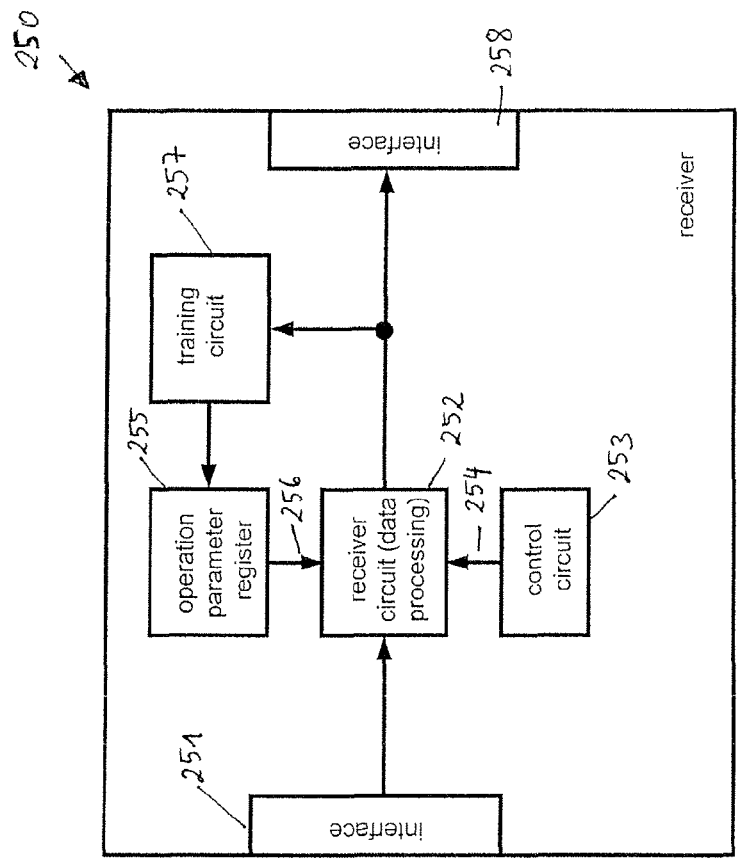
FIG. 12 is a schematic block diagram representation of a receiver according to one embodiment of the present invention.

FIG. 12 is a schematic block diagram representation of a receiver 250 according to an exemplary embodiment of the invention which may, e.g., be employed as receiver 151 in the communication system 140 of FIG. 7. The receiver 250 comprises an interface 251 to receive data from a transmitter and a receiver circuit 252 to process the data. Operation of the receiver circuit 252 is based on operational parameters stored in a register 255. While the register 255 is shown as a separate entity in FIG. 12, it is to be understood that the register may be integrated with the receiver circuit 252. Examples for operational parameters stored in the register 255 include cut-off frequencies of filters of the receiver circuit 252, amplifier gains etc. The control circuit 253 controls the configuration of the receiver circuit 252 via control signal 254. In one embodiment, the control circuit 253 controls the configuration of the receiver circuit 252 so that, when a training signal generated based on a new configuration is to be processed, the receiver circuit 252 is also in the new configuration, but remains in the old configuration to process other signals that are not training signals.

In one embodiment, the new and old configurations correspond to new and old PSDs, the control circuit 253 controlling the receiver circuit 252 to process signals having different PSDs. In one embodiment, the control circuit 253 controls the receiver circuit 252 to switch between the different PSDs synchronously with the transmitter circuit. For example, when sync symbols are generated based on the new PSD, the control circuit 253 may control the receiver circuit 252 to switch to the new PSD for processing sync symbols.

The fully or partially processed training signals are provided to a training circuit 257 which adjusts the operational parameters stored in register 255 based on the signals. In one embodiment, the training circuit may compare the fully or partially processed training signals to the predetermined data based on which the training signals are generated, and may adapt the operational parameters in register 255 based on the comparison. In one embodiment, the training circuit 257 only adapts the operational parameters that are retrieved by the receiver circuit 252 for operation according to the new configuration.

When retraining is completed, the control circuit 253 directs the receiver circuit 252 to switch to and remain in the new configuration, so that the receiver circuit processes all signals received at interface 251 based on the new configuration.

Figure 13:
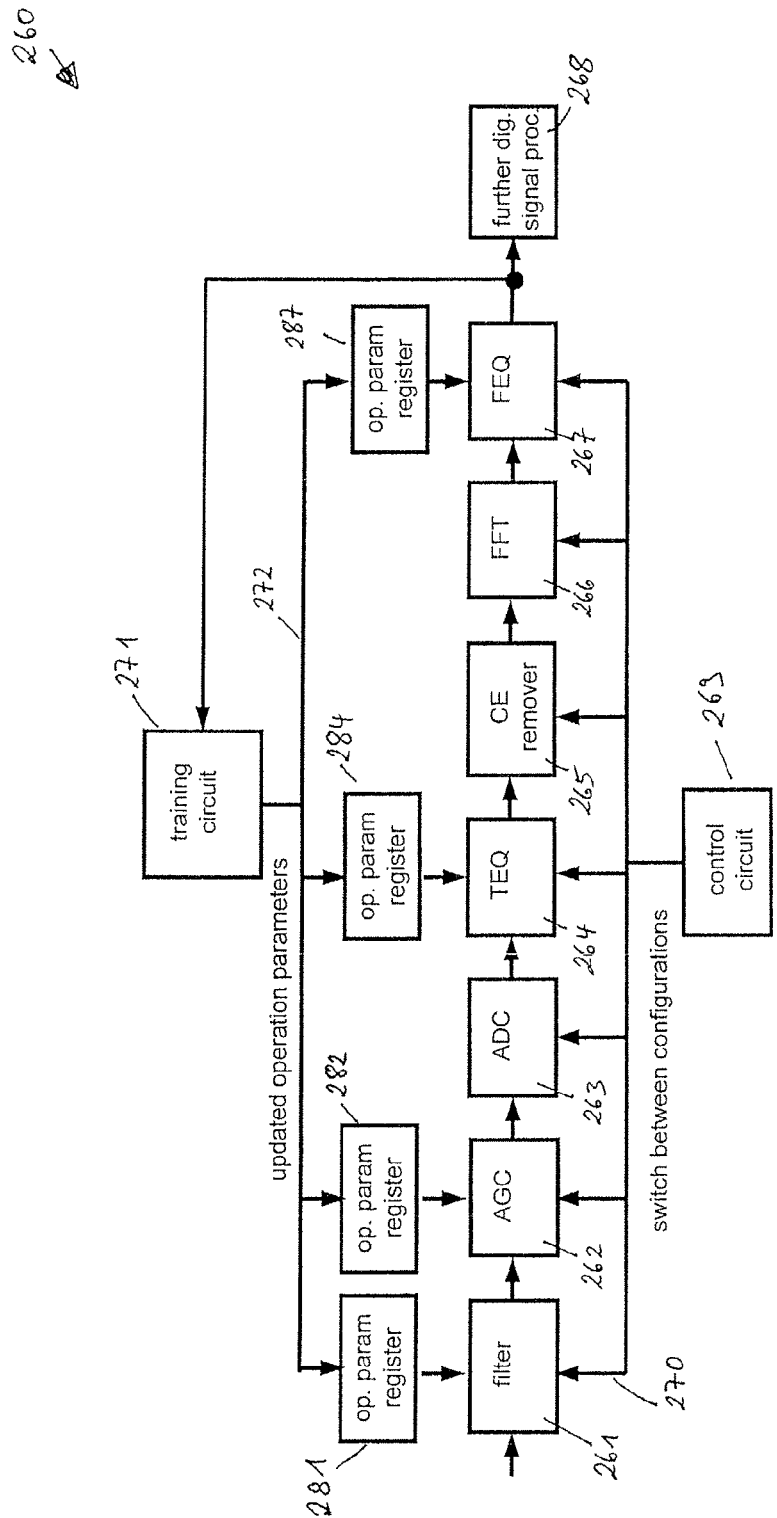
FIG. 13 is a schematic block diagram representation of a receiver according to another embodiment of the present invention.

FIG. 13 is a schematic block diagram representation of a receiver 260 according to one exemplary embodiment, showing an exemplary implementation of the receiver circuit. The receiver circuit comprises a filter 261, an automatic gain control (AGC), an AID-converter 263, a time domain equalizer (TEQ) 264, a cyclic extension remover 265, a fast Fourier transform (FFT) unit 266, a frequency domain equalizer (FEQ) 276 and further units 268 for additional digital signal processing. In the exemplary embodiment of FIG. 13, a control circuit 269 of the receiver 260 is coupled to each of the units 261-267 to provide control signals 270 to the units 261-267 in order to switch the receiver circuit between different configurations. For example, when different configurations correspond to different PSDs, the control circuit 269 may adjust a cut-off frequency of the filter 261, a gain of AGC 262, a sampling frequency of ADC 263, a cyclic extension length removed by cyclic extension remover 265, a tone spectrum of FFT unit 266, etc., based on whether signals generated based on a first or second PSD are to be processed. In other embodiments, the control circuit 269 may be coupled to only a subset of the functional units schematically shown in FIG. 13 to control their operation.

Register 281, 282, 284, 287 coupled to the filter 261, the AGC 262, the time domain equalizer 264 and the frequency domain equalizer 267 store operational parameters for these units that specify operation of the respective units when switched to the new configuration for which the receiver 260 is to be trained. By way of illustration, but not limitation, the register 281 may store a filter cut-off frequency, the register 282 may store an amplifier gain, and the registers 284 and 287 may store coefficients or vectors indicative of the respective equalizer functions. Based on the processed training signals, the training circuit 271 may update the values stored in registers 281, 282, 284, 287 to train the receiver 260 for the new configuration. Upon completion of the retraining phase, the filter 261, the AGC 262, the time domain equalizer 264, and the frequency domain equalizer 267 may continue operation based on the new operational parameters stored in the registers 281, 282, 284, 287 at this time.

The transmitter 230 of FIG. 11 and the receivers 250, 260 of FIGS. 12 and 13 may respectively be installed at a near end or at a far end of a data transmission connection. For example, the transmitter and receiver may respectively be installed in a central office or in customer premises. According to one embodiment, a transceiver may include both a transmitter 230 and a receiver 250 or 260 according to anyone of the embodiments described with reference to FIGS. 11-13 above. Pairs of such transceivers may be installed, e.g., in a central office and customer premises. In one embodiment, the transceiver pairs may be interconnected by copper wire pairs and may form a Digital Subscriber Line (xDSL) communication system. In one embodiment, the transmitter of a first transceiver installed in the central office and the receiver of a second transceiver installed in customer premises may be retrained independently from the receiver of the first transceiver and the transmitter of the second transceiver. I.e., a reconfiguration of upstream and downstream data communication may be performed independently.

While the retraining of data communication devices has been illustrated as retraining on sync symbols with reference to FIGS. 8-13 above, it will be appreciated that other symbols may be employed in the retraining. For example, specific sequences of sync symbols could be defined to assist the training. In one embodiment, the PSD of the sync symbols may vary during retraining, and may for example be gradually adjusted from the old PSD to the new PSD.

While exemplary embodiments of the invention have been described above, it is to be understood that the present invention is not intended to be limited by these embodiments. In particular, it is to be understood that any functional block or unit shown in the drawings and explained above is shown as a separate entity only for the purpose of better illustrating the principles of the invention. However, the different functional blocks do not need to be provided as separate units. For example, different functional units of a transmitter or receiver circuit may be configured as an integrated circuit, e.g., those units performing digital signal processing. In another embodiment, the monitoring circuit, the control circuit or the evaluation circuit may be formed as an integrated circuit together with transmitter or receiver circuit components.

Still further, the functionalities of the functional blocks shown in the drawings and described above may be implemented by hardware, by software or a combination of both. Further, as used herein, circuits may be implemented fully in hardware, or by a combination of hardware, software or firmware. For example, the transmitter and/or receiver circuits may be configured so that they comprise a multi-purpose processor which is programmed so that it performs a part of the digital signal processing functions.

While a reconfiguration of data communication devices has been explained in the context of a change in PSD for some of the exemplary embodiments described above, this description is only given for the purpose of better illustrating the principles of the invention, and the present invention is not limited thereto. Rather, a reconfiguration may also correspond to a change in any other configuration parameter (s), for example a change in number of tones or frequency spacing for DMT signals or bit allocation. Further, while some embodiments of the present invention have been described in the context of DSL systems, such as ADSL, the embodiments of the present invention are not limited thereto but may also be applied in other communication systems, e.g., in wireless communication.

What is claimed is:

1. A communication device, comprising a transmitter operable configurable to:
couple transmit payload data to a plurality of transceivers via a plurality of transmission channels;
transmit payload data via the plurality of transmission channels;
during showtime operation, obtain monitored transmission conditions for one or more transmission channels in the plurality of transmission channels; and
during showtime operation, generate reconfiguration request signals resultant from processing the monitored transmission conditions, the generated reconfiguration request signals indicating bit allocation values a new transmitted signal strength indication, TSSI, and transmit the reconfiguration request signals on at least one of the plurality of the transmission channels in the plurality of transmission channels to command cause at least one of the plurality of transceivers to change its bit allocation values according to the bit allocation values indicated by the reconfiguration request signal and generate new payload data using the new bit allocation values and a transmitted signal strength indication, TSSI, to be changed during showtime operation for at least one of the plurality of transmission channels without interrupting showtime operation.

2. The communication device of claim 1, wherein the monitored transmission conditions correspond to dynamically varying noise conditions due to cross-talk between at least some of the plurality of transmission channels.

3. The communication device of claim 1, wherein the reconfiguration request signals indicate a new maximum power spectral density.

4. The communication device of claim 1, wherein the reconfiguration request signals generated during showtime operation indicate a new signal to noise margin and the new TSSI.

5. The communication device of claim 1, wherein the communication device is a DSL modem and the reconfiguration request signals are transmitted on the transmission channels in a downstream direction to the plurality of transceivers.

6. The communication device of claim 1, further comprising a receiver operable to receive, during showtime operation and in response to the reconfiguration request signals, reconfiguration response signals on the transmission channels over which the reconfiguration request signals were transmitted, wherein the reconfiguration response signals indicate whether the at least one of the plurality of transceivers coupled to the communication device over the plurality of transmission channels accepts or rejects a new configuration indicated by the reconfiguration request signals.

7. The communication device of claim 6, wherein the communication device is a DSL modem and the reconfiguration response signals are received on the transmission channels in an upstream direction from the plurality of transceivers.

8. The communication device of claim 6, wherein the transmitter is operable to transmit new payload data based on new bit allocation values and new gain values to each transceiver from which the received reconfiguration response signal indicates the transceiver accepts the new configuration indicated by the reconfiguration signal transmitted to that transceiver.

9. The communication device of claim 6, wherein the transmitter is operable to reconfigure itself when the reconfiguration response signal received on one of the transmission channels during showtime operation indicates that the corresponding transceiver accepts the new configuration indicated by the reconfiguration signal transmitted to that transceiver.

10. A method of operating a communication device, comprising:
  transmitting payload data by a transmitter of the communication device to a plurality of transceivers via a plurality of transmission channels;
  during showtime operation, obtaining monitored transmission conditions at the transmitter for one or more transmission channels in the plurality of transmission channels; and
  during showtime operation, generating reconfiguration request signals by the transmitter resultant from processing the monitored transmission conditions, the generated reconfiguration request signals indicating bit allocation values a new transmitted signal strength indication, TSSI, and transmitting the reconfiguration request signals from the transmitter to at least one of the transceivers on transmission channels in the plurality of transmission channels to command at least one of the plurality of transceivers to generate new payload data using the new bit allocation values and a transmitted signal strength indication, TSSI, cause bit allocation values to be changed during showtime operation for at least one of the plurality of transmission channels without interrupting showtime operation.

11. The method of claim 10, wherein the monitored transmission conditions correspond to dynamically varying noise conditions due to cross-talk between at least some of the plurality of transmission channels.

12. The method of claim 10, wherein the reconfiguration request signals indicate a new maximum power spectral density.

13. The method of claim 10, wherein the reconfiguration request signals during showtime operation indicate a new signal to noise margin and the new TSSI.

14. The method of claim 10, wherein the communication device is a DSL modem and the reconfiguration request signals are transmitted on the transmission channels in a downstream direction from the transmitter to the plurality of transceivers.

15. The method of claim 10, further comprising receiving, during showtime operation and in response to the reconfiguration request signals, reconfiguration response signals by a receiver of the communication device on the transmission channels over which the reconfiguration request signals were transmitted, wherein the reconfiguration response signals indicate whether the at least one of plurality of transceivers coupled to the communication device over the plurality of transmission channels accept or reject a new configuration indicated by the reconfiguration request signals.

16. The method of claim 15, wherein the communication device is a DSL modem and the reconfiguration response signals are received by the receiver on the transmission channels in an upstream direction from the plurality of transceivers.

17. The method of claim 15, further comprising transmitting new payload data based on new bit allocation values and new gain values from the transmitter to each transceiver from which the received reconfiguration response signal indicates the transceiver accepts the new configuration indicated by the reconfiguration signal transmitted to that transceiver.

18. The method of claim 15, further comprising reconfiguring the transmitter during showtime operation when the reconfiguration response signal received on one of the transmission channels indicates that the corresponding transceiver accepts the new configuration indicated by the reconfiguration signal transmitted to that transceiver.

19. A communication device, comprising:
  a transmitter operable to:
    couple to a plurality of transceivers via a plurality of transmission channels;
    transmit payload data via the plurality of transmission channels;
    obtain monitored transmission conditions for one or more transmission channels in the plurality of transmission channels; and
    during showtime operation, generate reconfiguration request signals resultant from processing the monitored transmission conditions, the generated reconfiguration request signals indicating a new transmitted signal strength indication, TSSI bit allocation values, and transmit the reconfiguration request signals on transmission channels in the plurality of transmission channels to command at least one of the plurality of transceivers to change its bit allocation values according to the bit allocation values indicated by the reconfiguration request signal and generate a new transmitted signal strength indication, TSSI, cause bit allocation values to be changed during showtime operation for at least one of the plurality of transmission channels without interrupting showtime operation; and a receiver operable to receive, during showtime operation and in response to the reconfiguration request signals, reconfiguration response signals on the transmission channels over which the reconfiguration request signals were transmitted, the reconfiguration response signals indicating whether the at least one of the plurality of transceivers coupled to the communication device over the plurality of transmission channels accepts or rejects a new configuration indicated by the reconfiguration request signals.

20. The communication device of claim 19, wherein the transmitter is operable to transmit new payload data based on new bit allocation values and new gain values to each transceiver from which the received reconfiguration response signal indicates the transceiver accepts the new configuration indicated by the reconfiguration signal transmitted to that transceiver.

21. A communication device, comprising a receiver operable to:
couple to a transceiver via a transmission channel;
receive payload data via the transmission channel;
during showtime operation, to receive reconfiguration request signals resultant from processing the monitored transmission conditions, the generated reconfiguration request signals indicating bit allocation values, and transmit the reconfiguration request signals on transmission channels in the plurality of transmission channels to command at least one of the plurality of transceivers to change its bit allocation values according to the bit allocation values indicated by the reconfiguration request signal and generate a new transmitted signal strength indication, TSSI, during showtime operation for at least one of the plurality of transmission channels without interrupting showtime operation.

22. The communication device of claim 21, wherein the monitored transmission conditions correspond to dynamically varying noise conditions due to cross-talk between at least some of the plurality of transmission channels.

23. The communication device of claim 21, wherein the reconfiguration request signals indicate a new maximum power spectral density.

24. The communication device of claim 21, wherein the reconfiguration request signals generated during showtime operation indicate a new signal to noise margin and the new TSSI.

25. The communication device of claim 21, wherein the communication device is a DSL modem and the reconfiguration request signals are transmitted on the transmission channels in a downstream direction to the plurality of transceivers.

26. The communication device of claim 25, further comprising a receiver operable to receive, during showtime operation and in response to the reconfiguration request signals, reconfiguration response signals on the transmission channels over which the reconfiguration request signals were transmitted, wherein the reconfiguration response signals indicate whether the at least one of the plurality of transceivers coupled to the communication device over the plurality of transmission channels accepts or rejects a new configuration indicated by the reconfiguration request signals.

27. The communication device of claim 26, wherein the communication device is a DSL modem and the reconfiguration response signals are received on the transmission channels in an upstream direction from the plurality of transceivers.

28. The communication device of claim 26, wherein the transmitter is operable to transmit new payload data based on new bit allocation values and new gain values to each transceiver from which the received reconfiguration response signal indicates the transceiver accepts the new configuration indicated by the reconfiguration signal transmitted to that transceiver.

29. The communication device of claim 26, wherein the transmitter is operable to reconfigure itself when the reconfiguration response signal received on one of the transmission channels during showtime operation indicates that the corresponding transceiver accepts the new configuration indicated by the reconfiguration signal transmitted to that transceiver.

* * * * *